(12) United States Patent
Ihara et al.

(10) Patent No.: US 9,196,927 B2
(45) Date of Patent: Nov. 24, 2015

(54) BATTERY INCLUDING AN ELECTROLYTIC SOLUTION CONTAINING A SULFONE COMPOUND

(75) Inventors: Masayuki Ihara, Fukushima (JP);
Hiroyuki Yamaguchi, Fukushima (JP);
Tadahiko Kubota, Kanagawa (JP)

(73) Assignee: Sony Corporation, Tokyo (JP)

( * ) Notice: Subject to any disclaimer, the term of this patent is extended or adjusted under 35 U.S.C. 154(b) by 1116 days.

(21) Appl. No.: 11/871,676

(22) Filed: Oct. 12, 2007

(65) Prior Publication Data

US 2008/0096112 A1 Apr. 24, 2008

(30) Foreign Application Priority Data

Oct. 13, 2006 (JP) ................. 2006-280245

(51) Int. Cl.
*H01M 10/0567* (2010.01)
*H01M 10/0569* (2010.01)
*H01M 10/05* (2010.01)
*H01M 4/134* (2010.01)
*H01M 4/1395* (2010.01)
*H01M 6/16* (2006.01)
*H01M 10/0525* (2010.01)
*H01M 10/0568* (2010.01)

(52) U.S. Cl.
CPC .......... *H01M 10/0567* (2013.01); *H01M 4/134* (2013.01); *H01M 4/1395* (2013.01); *H01M 6/164* (2013.01); *H01M 6/166* (2013.01); *H01M 6/168* (2013.01); *H01M 10/0525* (2013.01); *H01M 10/0568* (2013.01); *H01M 10/0569* (2013.01); *H01M 2300/0025* (2013.01); *Y02E 60/122* (2013.01)

(58) Field of Classification Search
CPC ..... H01M 4/134; H01M 6/164; H01M 6/166; H01M 6/168; H01M 10/0567; H01M 10/0568; H01M 10/0569
USPC ....................... 429/218.1, 338, 340
See application file for complete search history.

(56) References Cited

U.S. PATENT DOCUMENTS

| | | | |
|---|---|---|---|
| 2004/0043300 A1* | 3/2004 | Utsugi et al. ................. 429/329 |
| 2005/0250008 A1* | 11/2005 | Mizutani et al. ............. 429/209 |
| 2006/0068292 A1* | 3/2006 | Mizutani et al. ........... 429/231.8 |
| 2006/0099515 A1* | 5/2006 | Yamaguchi et al. .......... 429/338 |
| 2008/0063946 A1 | 3/2008 | Kubota et al. |

FOREIGN PATENT DOCUMENTS

| | | |
|---|---|---|
| CN | 1495959 | 5/2004 |
| JP | 2004-22336 | 1/2004 |

(Continued)

OTHER PUBLICATIONS

Machine translation for Utsuki et al., JP 2004-022336 A.*

(Continued)

*Primary Examiner* — Edu E Enin-Okut
(74) *Attorney, Agent, or Firm* — K&L Gates LLP

(57) ABSTRACT

A battery capable of improving the cycle characteristics and the storage characteristics is provided. The battery includes a cathode, an anode, and an electrolytic solution. The anode contains a material that can insert and extract an electrode reactant and contains at least one of a metal element and a metalloid element as an element, and the electrolytic solution contains a solvent, an electrolyte salt, and a sulfone compound having a given structure.

7 Claims, 4 Drawing Sheets

(56) References Cited

FOREIGN PATENT DOCUMENTS

| | | | | |
|---|---|---|---|---|
| JP | 2004-022336 | | 1/2004 | |
| JP | 2004-022336 A | * | 1/2004 | ............ H01M 10/40 |
| JP | 2004022336 A | * | 1/2004 | ............ H01M 10/40 |
| JP | 2004-087437 | | 3/2004 | |
| JP | 2005-135701 | | 5/2005 | |
| JP | 2005-228631 | | 8/2005 | |
| JP | 3760539 | | 1/2006 | |
| JP | 2006-032301 | | 2/2006 | |
| JP | 2006-134719 | | 5/2006 | |
| JP | 2006-140115 | | 6/2006 | |
| WO | WO 2004100291 A1 | * | 11/2004 | ............ H01M 4/38 |
| WO | 2006/033358 | | 3/2006 | |

OTHER PUBLICATIONS

Chinese Office Action issued Nov. 29, 2013 for corresponding Chinese Appln. No. 201210022150.3.

Korean Office Action issued Dec. 24, 2013 for corresponding Korean Appln. No. 10-2007-0103041.

* cited by examiner

BATTERY INCLUDING AN ELECTROLYTIC SOLUTION CONTAINING A SULFONE COMPOUND

CROSS REFERENCES TO RELATED APPLICATIONS

The present application claims priority to Japanese Patent Application JP 2006-280245 filed in the Japanese Patent Office on Oct. 13, 2006, the entire contents of which is being incorporated herein by reference.

BACKGROUND

The present application relates to a battery including a cathode, an anode, and an electrolytic solution.

In recent years, portable electronic devices such as combination cameras (videotape recorder), mobile phones, and notebook personal computers have been widely used, and it is strongly demanded to reduce their size and weight and to achieve their long life. Accordingly, as a power source for the portable electronic devices, a battery, in particular a light-weight secondary batter capable of providing a high energy density has been developed.

Specially, a secondary battery using insertion and extraction of lithium for charge and discharge reaction (so-called lithium ion secondary battery) is extremely prospective, since such a lithium ion secondary battery can provide the higher energy density compared to a lead battery and a nickel cadmium battery. In such a secondary battery, a carbon material is widely used as an anode active material. However, since the battery capacity is demanded to further improve recently, it has been considered to use silicon or the like as an anode active material instead of the carbon material. Since the theoretical capacity of silicon (4199 mAh/g) is extremely larger than the theoretical capacity of graphite (372 mAh/g), silicon is expected to largely improve the battery capacity.

For the composition of the electrolytic solution used for the secondary battery, for the purpose of improving various performances, several techniques have been already suggested. Specifically, a technique for forming an electrolytic solution containing a chain or cyclic sulfone compound for the purpose of improving the cycle characteristics and the like is known. As the sulfone compound, chain or cyclic disulfonic acid anhydride (for example, refer to Japanese Patent No. 3760539 and Japanese Unexamined Patent Application Publication No. 2004-022336), cyclic disulfonate compound (for example, refer to Japanese Unexamined Patent Application Publication No. 2005-228631), chain vinyl disulfone compound (for example, refer to Japanese Unexamined Patent Application Publication No. 2005-135701) or the like is used. When the cyclic disulfonic acid anhydride is used, a carbon material, lithium metal, a lithium alloy or the like is used as an anode active material.

In the recent electronic devices, there is a tendency that their high performance and multi-functions are increasingly developed. Thus, there is a tendency that the cycle characteristics are easily lowered by frequently repeating charge and discharge of the secondary battery. In addition, there is a tendency that the heat release value is increased due to factors such as high performance of electronic parts typified by a CPU (central processing unit). Thus, the secondary battery is exposed in the high temperature atmosphere, and thereby the storage characteristics tend to be lowered. Therefore, it is aspired that the cycle characteristics and the storage characteristics of the secondary battery could be further improved.

SUMMARY

In view of the foregoing, it is desirable to provide a battery capable of improving the cycle characteristics and the storage characteristics.

According to an embodiment, there is provided a battery including a cathode, an anode, and an electrolytic solution, wherein the anode contains a material that can insert and extract an electrode reactant and contains at least one of a metal element and a metalloid element as an element, and the electrolytic solution contains a solvent, an electrolyte salt, and a sulfone compound shown in Chemical formula 1.

Chemical formula 1 where X represents an alkylene group with the carbon number in the range from 2 to 4, an alkenylene group with the carbon number in the range from 2 to 4, an aromatic ring, or a derivative thereof.

According to the battery of an embodiment, the anode contains a material that can insert and extract an electrode reactant and contains at least one of a metal element and a metalloid element as an element. In addition, the electrolytic solution contains the sulfone compound shown in Chemical formula 1. Therefore, compared to a case that the electrolytic solution does not contain the sulfone compound, the decomposition reaction of the electrolytic solution is prevented. Further, the electrolytic solution contains the sulfone compound shown in Chemical formula 1 when the anode contains the foregoing material. Therefore, compared to a case that the anode contains a carbon material or the like, the decomposition inhibition effects of the electrolytic solution becomes larger. Thus, the electrolytic solution becomes sufficiently stable electrochemically. In the result, the cycle characteristics and the storage characteristics can be improved. In this case, when the content of the sulfone compound in the electrolytic solution is in the range from 0.01 wt % to 5 wt %, higher effects can be obtained. Further, when the anode contains at least one of the simple substance of silicon, an alloy of silicon, a compound of silicon, the simple substance of tin, an alloy of tin, and a compound of tin, improvement of the cycle characteristics and the storage characteristics is strongly demanded. Even in this case, higher effects can be obtained.

Additional features and advantages are described herein, and will be apparent from, the following Detailed Description and the figures.

DETAILED DESCRIPTION

The present application will be described below in greater detail according to an embodiment with reference to the drawings.

First Embodiment

Figure 1:
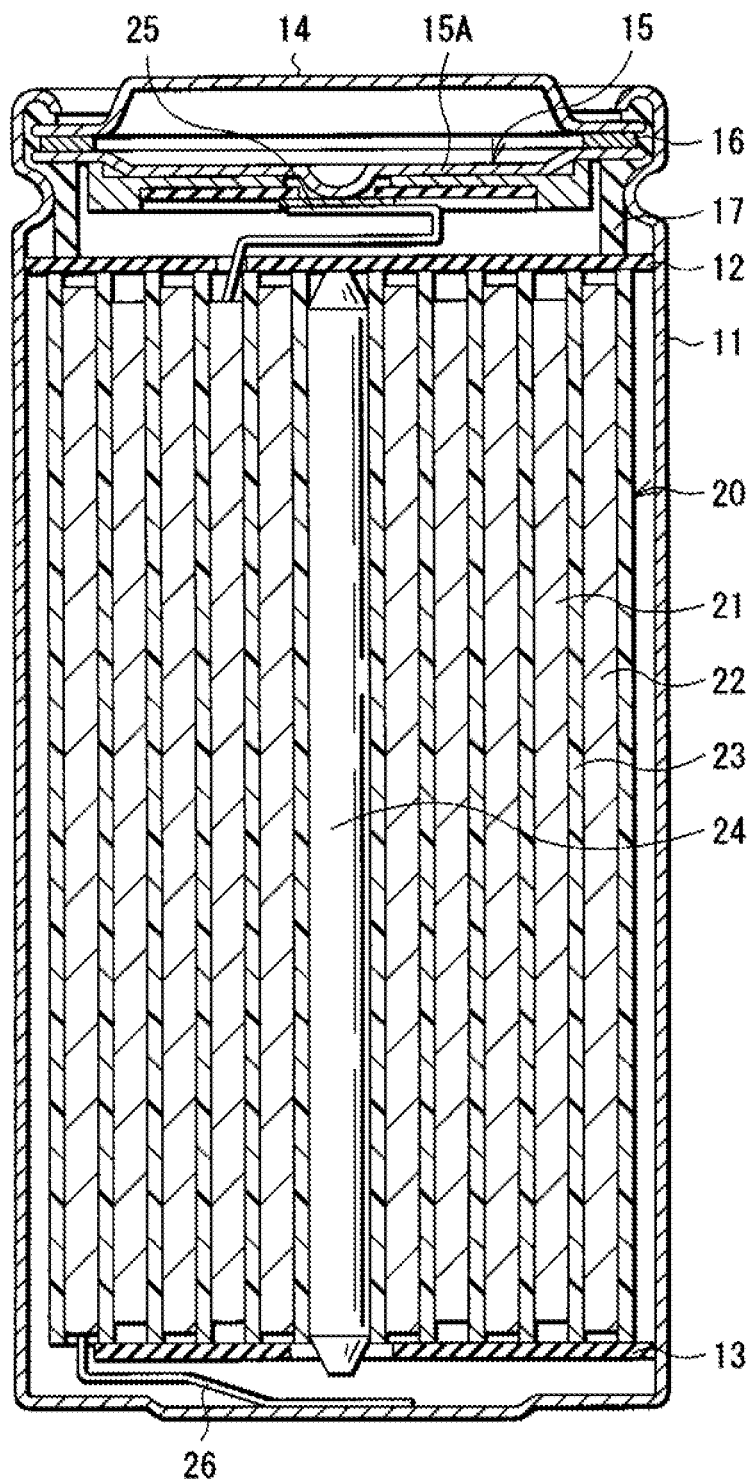
FIG. 1 is a cross section showing a structure of a battery using an electrolytic solution according to a first embodiment.

FIG. 1 shows a cross sectional structure of a battery according to a first embodiment. The battery is, for example, a so-called lithium ion secondary battery in which the anode capacity is expressed by the capacity component based on insertion and extraction of lithium as an electrode reactant. FIG. 1 shows a battery structure of a so-called cylinder type secondary battery.

The secondary battery contains a spirally wound electrode body 20 in which a cathode 21 and an anode 22 are spirally wound with a separator 23 in between, and a pair of insulating plates 12 and 13 inside a battery can 11 in the shape of an approximately hollow cylinder. The battery can 11 is made of, for example, iron (Fe) plated by nickel (Ni). One end of the battery can 11 is closed, and the other end thereof is opened. The pair of insulating plates 12 and 13 is arranged to sandwich the spirally wound electrode body 20 in between and to extend perpendicularly to the spirally wound periphery face.

At the open end of the battery can 11, a battery cover 14, and a safety valve mechanism 15 and a PTC (Positive Temperature Coefficient) device 16 provided inside the battery cover 14 are attached by being caulked with a gasket 17. Inside of the battery can 11 is thereby hermetically sealed. The battery cover 14 is made of, for example, a material similar to that of the battery can 11. The safety valve mechanism 15 is electrically connected to the battery cover 14 through the PTC device 16. In the safety valve mechanism 15, when the internal pressure of the battery becomes a certain level or more by internal short circuit, external heating or the like, a disk plate 15A flips to cut the electrical connection between the battery cover 14 and the spirally wound electrode body 20. When the temperature rises, the PTC device 16 increases the resistance and thereby limits a current to prevent abnormal heat generation resulting from a large current. The gasket 17 is made of, for example, an insulating material and its surface is coated with asphalt.

For example, a center pin 24 is inserted in the center of the spirally wound electrode body 20. In the spirally wound electrode body 20, a cathode lead 25 made of aluminum (Al) or the like is connected to the cathode 21, and an anode lead 26 made of nickel or the like is connected to the anode 22. The cathode lead 25 is electrically connected to the battery cover 14 by being welded to the safety valve mechanism 15. The anode lead 26 is welded and thereby electrically connected to the battery can 11.

Figure 2:
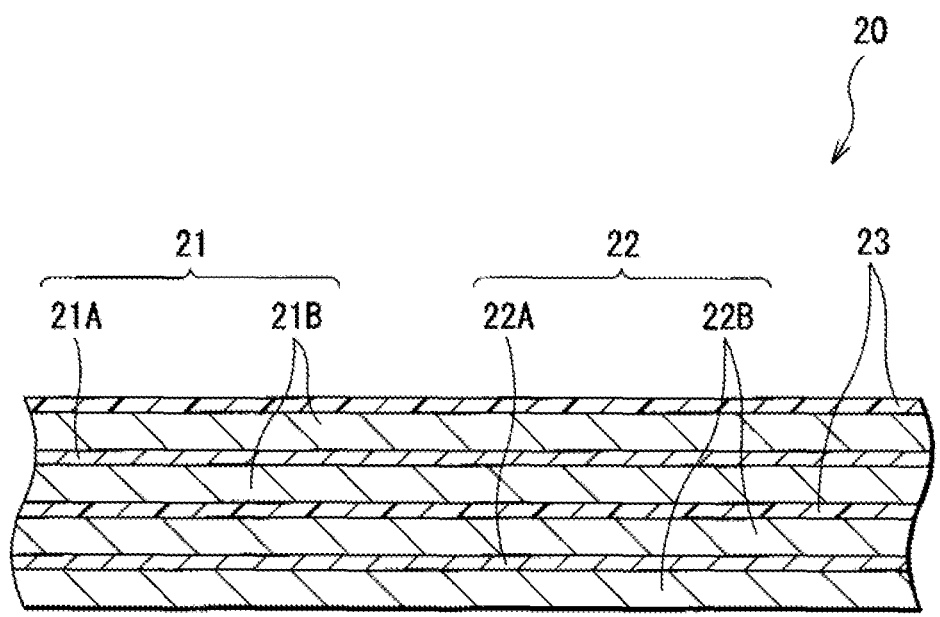
FIG. 2 is a cross section showing an enlarged part of a spirally wound electrode body shown in FIG. 1.

FIG. 2 shows an enlarged part of the spirally wound electrode body 20 shown in FIG. 1. The cathode 21 has a structure in which, for example, a cathode active material layer 21B is provided on the both faces of a cathode current collector 21A having a pair of opposed faces. The cathode current collector 21A is made of, for example, a metal material such as aluminum, nickel, and stainless. The cathode active material layer 21B contains, for example, as a cathode active material, one or more cathode materials capable of inserting and extracting lithium as an electrode reactant. If necessary, the cathode active material layer 21B may contain an electrical conductor, a binder and the like.

As the cathode material capable of inserting and extracting lithium, for example, a lithium complex oxide such as lithium cobalt oxide, lithium nickel oxide, a solid solution containing them ($Li(Ni_xCo_yMn_z)O_2$, values of x, y, and z are respectively expressed as $0<x<1$, $0<y<1$, $0<z<1$, and $x+y+z=1$), lithium manganese oxide having a spinel structure ($LiMn_2O_4$), and a solid solution thereof ($Li(Mn_{2-v}Ni_v)O_4$, a value of v is expressed as $v<2$); or a phosphate compound having an olivine structure such as lithium iron phosphate ($LiFePO_4$) is preferable. Thereby, a high energy density can be obtained. In addition to the foregoing, for example, an oxide such as titanium oxide, vanadium oxide and manganese dioxide; a disulfide such as iron disulfide, titanium disulfide, and molybdenum sulfide; sulfur; a conductive polymer such as polyaniline and polythiophene can be cited.

The anode 22 has a structure in which, for example, an anode active material layer 22B is provided on the both faces of an anode current collector 22A having a pair of opposed faces. The anode current collector 22A is made of a metal material such as copper (Cu), nickel, and stainless. The anode active material layer 22B contains, as an anode active material, one or more anode materials capable of inserting and extracting lithium as an electrode reactant. If necessary, the anode active material layer 22B may contain an electrical conductor, a binder and the like.

As the anode material capable of inserting and extracting lithium, for example, a material that is capable of inserting and extracting lithium, and contains at least one of metal elements and metalloid elements as an element can be cited. Such an anode material is preferably used, since a high energy density can be thereby obtained. Such an anode material may be a simple substance, an alloy, or a compound of a metal element or a metalloid element, or may have one or more phases thereof at least in part. In the application, alloys include an alloy containing one or more metal elements and one or more metalloid elements, in addition to an alloy including two or more metal elements. Further, an alloy in the application may contain a nonmetallic element. The texture thereof includes a solid solution, a eutectic crystal (eutectic mixture), an intermetallic compound, and a texture in which two or more thereof coexist.

As such a metal element or such a metalloid element composing the anode material, for example, a metal element or a metalloid element capable of forming an alloy with lithium can be cited. Specifically, magnesium (Mg), boron (B), aluminum (Al), gallium (Ga), indium (In), silicon, germanium (Ge), tin, lead (Pb), bismuth (Bi), cadmium (Cd), silver (Ag), zinc (Zn), hafnium (Hf), zirconium (Zr), yttrium (Y), palladium (Pd), platinum (Pt) and the like can be cited. Of the foregoing, at least one of silicon and tin is particularly preferable. Silicon and tin particularly have the high ability to insert and extract lithium, and can provide a high energy density.

As an anode material containing at least one of silicon and tin, for example, a simple substance, an alloy, or a compound of silicon; a simple substance, an alloy, or a compound of tin; or a material having one or more phases thereof at least in part can be cited. Any thereof may be used singly, or one or more thereof may be used by mixing.

As the alloy of silicon, for example, an alloy containing at least one selected from the group consisting of tin, nickel, copper, iron, cobalt (Co), manganese (Mn), zinc, indium, silver, titanium (Ti), germanium, bismuth, antimony (Sb), and chromium (Cr) as a second element other than silicon can be cited. As the alloy of tin, for example, an alloy containing at least one selected from the group consisting of silicon, nickel, copper, iron, cobalt, manganese, zinc, indium, silver, titanium, germanium, bismuth, antimony, and chromium as a second element other than tin can be cited.

As the compound of tin or the compound of silicon, for example, a compound containing oxygen (O) or carbon (C)

can be cited. In addition to tin or silicon, the compound may contain the foregoing second element.

Further, as the anode material containing at least one of silicon and tin, for example, an anode material containing a second element and a third element in addition to tin as a first element can be also cited. It is needless to say that the anode material can be used together with the above-mentioned anode material. As the second element, at least one selected from the group consisting of cobalt, iron, magnesium, titanium, vanadium (V), chromium, manganese, nickel, copper, zinc, gallium, zirconium, niobium (Nb), molybdenum (Mo), silver, indium, cerium (Ce), hafnium, tantalum (Ta), tungsten (W), bismuth, and silicon is used. As the third element, at least one selected from the group consisting of boron, carbon, aluminum, and phosphorus (P) is used. When the second element and the third element are contained, the cycle characteristics can be improved.

Specially, a CoSnC-containing material that contains tin, cobalt, and carbon as an element, in which the carbon content is in the range from 9.9 wt % to 29.7 wt %, and the cobalt ratio to the total of tin and cobalt (Co/(Sn+Co)) is in the range from 30 wt % to 70 wt % is preferable. In such a composition range, a high energy density can be obtained, and superior cycle characteristics can be obtained.

The CoSnC-containing material may further contain other element according to needs. As other element, for example, silicon, iron, nickel, chromium, indium, niobium, germanium, titanium, molybdenum, aluminum, phosphorus, gallium, bismuth or the like is preferable. Two or more thereof may be contained, since thereby the capacity or the cycle characteristics can be further improved.

The CoSnC-containing material has a phase containing tin, cobalt, and carbon. Such a phase preferably has a low crystallinity structure or an amorphous structure. Further, in the CoSnC-containing material, at least part of carbon as an element is preferably bonded to a metal element or a metalloid element as other element. It is thought that lowering of cycle characteristics is caused by cohesion or crystallization of tin or the like. In this regard, when carbon is bonded to other element, such cohesion or crystallization can be prevented.

As a measurement method for examining bonding state of elements, for example, X-ray Photoelectron Spectroscopy (XPS) can be cited. In XPS, in the case of graphite, the peak of 1s orbit of carbon (C1s) is observed at 284.5 eV in the apparatus in which energy calibration is made so that the peak of 4f orbit of gold atom (Au4f) is obtained in 84.0 eV. In the case of surface contamination carbon, the peak is observed at 284.8 eV. Meanwhile, in the case of higher electric charge density of carbon element, for example, when carbon is bonded to a metal element or a metalloid element, the peak of C1s is observed in the region lower than 284.5 eV. That is, when the peak of the composite wave of C1s obtained for the CoSnC-containing material is observed in the region lower than 284.5 eV, at least part of carbon contained in the CoSnC-containing material is bonded to the metal element or the metalloid element as other element.

In XPS, for example, the peak of C1s is used for correcting the energy axis of spectrums. Since surface contamination carbon generally exists on the surface, the peak of C1s of the surface contamination carbon is set to in 284.8 eV, which is used as an energy reference. In XPS, the waveform of the peak of C1s is obtained as a form including the peak of the surface contamination carbon and the peak of carbon in the CoSnC-containing material. Therefore, the waveform of C1s is analyzed by using, for example, commercially available software to separate the peak of the surface contamination carbon and the peak of carbon in the CoSnC-containing material. In the analysis of the waveform, the position of the main peak existing on the lowest bound energy side is set to the energy reference (284.8 eV).

As an anode material capable of inserting and extracting lithium in addition to the above-mentioned anode material, for example, a carbon material, a metal oxide, a polymer compound and the like can be cited. It is needless to say that such an anode material may be used together with the above-mentioned anode material As the carbon material, for example, graphitizable carbon, non-graphitizable carbon in which the spacing of (002) plane is 0.37 nm or more, or graphite in which the spacing of (002) plane is 0.34 nm or less can be cited. More specifically, pyrolytic carbons, coke, graphite, glassy carbons, an organic polymer compound fired body, carbon fiber, activated carbon or the like can be cited. Of the foregoing, the coke includes pitch coke, needle coke, petroleum coke and the like. The organic polymer compound fired body is obtained by firing and carbonizing a polymer compound such as a phenol resin and a furan resin at an appropriate temperature. In the carbon material, a change in the crystal structure due to insertion and extraction of lithium is very little. Therefore, by using the carbon material together with the foregoing anode material, a high energy density can be obtained and superior cycle characteristics can be obtained. In addition, the carbon material also functions as an electrical conductor, and thus the carbon material is preferably used. As the metal oxide, for example, iron oxide, ruthenium oxide, molybdenum oxide or the like can be cited. As the polymer compound, polyacetylene, polypyrrole or the like can be cited.

As the electrical conductor, for example, a carbon material such as graphite, carbon black, and Ketjen black can be cited. Such a carbon material may be used singly, or two or more thereof may be used by mixing. The electrical conductor may be a metal material or a conductive polymer as long as the material has the conductivity.

As the binder, for example, a synthetic rubber such as styrene-butadiene rubber, fluorinated rubber, and ethylene propylene diene; or a polymer material such as polyvinylidene fluoride can be cited. One thereof may be used singly, or two or more thereof may be used by mixing. However, when the cathode 21 and the anode 22 are spirally wound as shown in FIG. 1, flexible styrene-butadiene rubber, flexible fluorinated rubber or the like is preferably used.

In the secondary battery, by adjusting the amount of the cathode active material and the amount of the anode material capable of inserting and extracting lithium, the charge capacity by the anode material capable of inserting and extracting lithium becomes larger than the charge capacity by the cathode active material, so that lithium metal is not precipitated on the anode 22 even when fully charged.

The separator 23 separates the cathode 21 from the anode 22, and passes lithium ions while preventing current short circuit due to contact of the both electrodes. The separator 23 is made of, for example, a porous film made of a synthetic resin such as polytetrafluoroethylene, polypropylene, and polyethylene, or a ceramic porous film. The separator 23 may have a structure in which two or more porous films as the foregoing porous films are layered. Specially, a polyolefin porous film is preferable since the polyolefin porous film has superior effects for preventing short circuit, and can contribute to improving battery safety by the shutdown effect. In particular, polyethylene is preferable since the shutdown effect can be obtained in the range from 100 deg C. to 160 deg C., and their electrochemical stability is superior. Polypropylene is also preferable. In addition, a resin in which polyethylene and polypropylene are copolymerized or blended may be used, as long as the resin has the chemical stability.

An electrolytic solution as a liquid electrolyte is impregnated in the separator 23. The electrolytic solution contains a solvent, an electrolyte salt, and a sulfone compound shown in Chemical formula 1. When the electrolytic solution contains the sulfone compound shown in Chemical formula 1, the decomposition reaction of the electrolytic solution is prevented, and thereby superior cycle characteristics and superior storage characteristics can be obtained. In particular, the content of the sulfone compound shown in Chemical formula 1 in the electrolytic solution is preferably in the range from 0.01 wt % to 5 wt %. Thereby, higher effects can be obtained.

Chemical formula 1

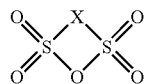

where X represents an alkylene group with the carbon number in the range from 2 to 4, an alkenylene group with the carbon number in the range from 2 to 4, an aromatic ring, or a derivative thereof.

As an example of the sulfone compound shown in Chemical formula 1, for example, a series of compounds shown in Chemical formula 2 can be cited. One thereof may be used singly, or two or more thereof may be used by mixing. The applicable compounds are not limited to the compounds shown in Chemical formula 2, as long as the compound is the sulfone compound having the structure shown in Chemical formula 1.

Chemical formula 2

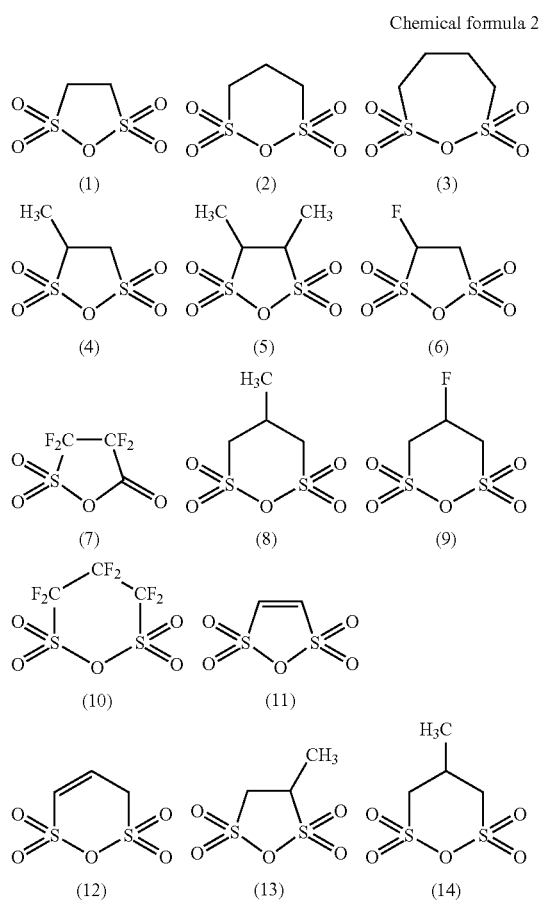

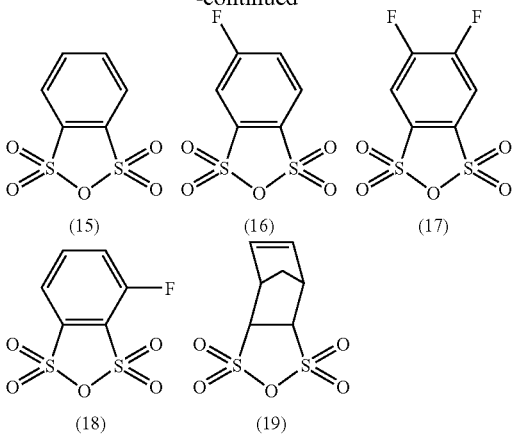

The solvent contains, for example, a nonaqueous solvent such as an organic solvent. As the nonaqueous solvent, for example, ethylene carbonate, propylene carbonate, butylene carbonate, 1,3-dioxole-2-one, dimethyl carbonate, diethyl carbonate, ethyl methyl carbonate, methyl propyl carbonate, γ-butyrolactone, γ-valerolactone, 1,2-dimethoxyethane, tetrahydrofuran, 2-methyltetrahydrofuran, tetrahydropyran, 1,3-dioxolane, 4-methyl-1,3-dioxolane, 1,3-dioxane, 1,4-dioxane, methyl acetate, ethyl acetate, methyl propionate, ethyl propionate, methyl butyrate, methyl isobutyrate, trimethylacetic acid methyl, trimethylacetic acid ethyl, acetonitrile, glutaronitrile, adiponitrile, methoxyacetonitrile, 3-methoxypropionitrile, N,N-dimethylformamide, N-methylpyrrolidinone, N-methyloxazolidinone, N,N'-dimethylimidazolidinone, nitromethane, nitroethane, sulfolane, dimethyl sulfoxide phosphate or the like can be cited. Thereby, superior capacity characteristics, superior cycle characteristics, and superior storage characteristics can be obtained. One of the foregoing nonaqueous solvents may be used singly, or two or more thereof may be used by mixing. Specially, the solvent preferably contains a mixture of a high-viscosity (high dielectric constant) solvent (for example, dielectric constant ∈≥30) such as ethylene carbonate and propylene carbonate and a low-viscosity solvent (for example, viscosity≤1 mPa·s) such as dimethyl carbonate, ethyl methyl carbonate, and diethyl carbonate. Thereby, the dissociation property of the electrolyte salt and the ion mobility are improved, and thus higher effects can be obtained.

In particular, the solvent preferably contains at least one selected from the group consisting of chain ester carbonate having a halogen as an element shown in Chemical formula 3 and cyclic ester carbonate having a halogen as an element shown in Chemical formula 4. Thereby, higher effects can be obtained.

Chemical formula 3

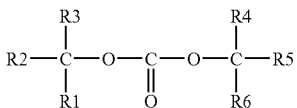

In the formula, R1 to R6 represent a hydrogen group, a halogen group, an alkyl group, or an alkyl halide group. R1 to R6 may be identical or different. However, at least one of R1 to R6 is a halogen group or an alkyl halide group.

Chemical formula 4

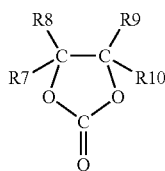

In the formula, R7 to R10 represents a hydrogen group, a halogen group, an alkyl group, or an alkyl halide group. R7 to R10 may be identical or different. However, at least one of R7 to R10 is a halogen group or an alkyl halide group.

As the chain ester carbonate having a halogen as an element shown in Chemical formula 3, for example, fluoromethyl methyl carbonate, bis(fluoromethyl) carbonate, difluoromethyl methyl carbonate or the like can be cited. One thereof may be used singly, or two or more thereof may be used by mixing.

As the cyclic ester carbonate having a halogen as an element shown in Chemical formula 4, for example, a series of compounds shown in Chemical formulas 5 and 6 can be cited. That is, 4-fluoro-1,3-dioxolane-2-one of Chemical formula 5(1), 4-chloro-1,3-dioxolane-2-one of Chemical formula 5(2), 4,5-difluoro-1,3-dioxolane-2-one of Chemical formula 5(3), tetrafluoro-1,3-dioxolane-2-one of Chemical formula 5(4), 4-fluoro-5-chloro-1,3-dioxolane-2-one of Chemical formula 5(5), 4,5-dichloro-1,3-dioxolane-2-one of Chemical formula 5(6), tetrachloro-1,3-dioxolane-2-one of Chemical formula 5(7), 4,5-bistrifluoromethyl-1,3-dioxolane-2-one of Chemical formula 5(8), 4-trifluoromethyl-1,3-dioxolane-2-one of Chemical formula 5(9), 4,5-difluoro-4,5-dimethyl-1,3-dioxolane-2-one of Chemical formula 5(10), 4-methyl-5,5-difluoro-1,3-dioxolane-2-one of Chemical formula 5(11), 4-ethyl-5,5-difluoro-1,3-dioxolane-2-one of Chemical formula 5(12) and the like can be cited. Further, 4-trifluoromethyl-5-fluoro-1,3-dioxolane-2-one of Chemical formula 6(1), 4-trifluoromethyl-5-methyl-1,3-dioxolane-2-one of Chemical formula 6(2), 4-fluoro-4,5-dimethyl-1,3-dioxolane-2-one of Chemical formula 6(3), 4,4-difluoro-5-(1,1-difluoroethyl)-1,3-dioxolane-2-one of Chemical formula 6(4), 4,5-dichloro-4,5-dimethyl-1,3-dioxolane-2-one of Chemical formula 6(5), 4-ethyl-5-fluoro-1,3-dioxolane-2-one of Chemical formula 6(6), 4-ethyl-4,5-difluoro-1,3-dioxolane-2-one of Chemical formula 6(7), 4-ethyl-4,5,5-trifluoro-1,3-dioxolane-2-one of Chemical formula 6(8), 4-fluoro-4-methyl-1,3-dioxolane-2-one of Chemical formula 6(9) and the like can be cited. One thereof may be used singly, or two or more thereof may be used by mixing. Specially, as the cyclic ester carbonate having a halogen as an element, at least one selected from the group consisting of 4-fluoro-1,3-dioxolane-2-one of Chemical formula 5(1) and 4,5-difluoro-1,3-dioxolane-2-one of Chemical formula 5(3) is preferable. In particular, the latter is more preferable than the former. The latter is easily available, and can provide higher effects. In particular, as 4,5-difluoro-1,3-dioxolane-2-one, a trans isomer is more preferable than a cis isomer to obtain higher effects.

Chemical formula 5

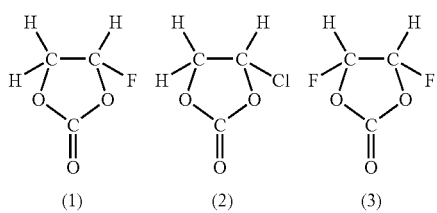

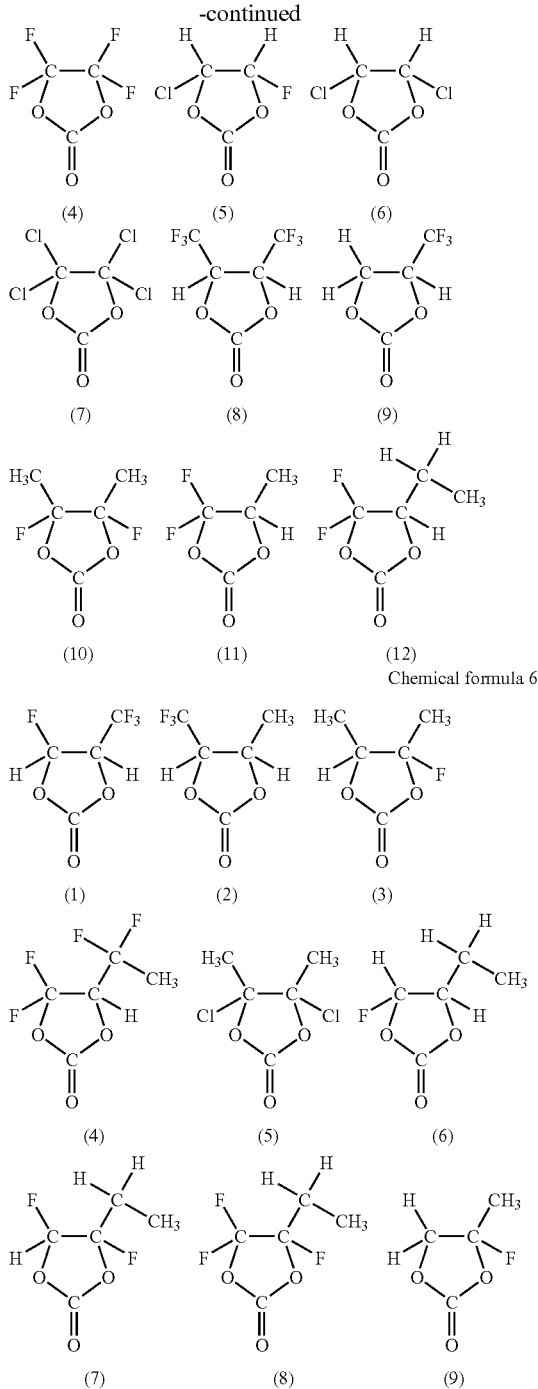

Further, the solvent preferably contains cyclic ester carbonate having an unsaturated bond. Thereby, higher effects can be obtained. As the cyclic ester carbonate having an unsaturated bond, for example, vinylene carbonate, vinyl ethylene carbonate and the like can be cited. One thereof may be used singly, or two or more thereof may be used by mixing. Specially, as the cyclic ester carbonate having an unsaturated bond, vinylene carbonate is preferably included. Thereby, sufficient effects can be obtained. In particular, in the case that the solvent contains the chain ester carbonate having a halogen as an element or cyclic ester carbonate having a halogen as an element described above, when the solvent further contains the cyclic ester carbonate having an unsaturated bond, significantly high effects can be obtained.

The electrolyte salt contains, for example, a light metal salt such as a lithium salt. As the lithium salt, for example, lithium hexafluorophospate (LiPF$_6$), lithium tetrafluoroborate (LiBF$_4$), lithium perchlorate (LiClO$_4$), lithium hexafluoroarsenate (LiAsF$_6$), lithium tetraphenyl borate (LiB(C$_6$H$_5$)$_4$), lithium methanesulfonate (LiCH$_3$SO$_3$), lithium trifluoromethanesulfonate (LiCF$_3$SO$_3$), lithium tetrachloroaluminate (LiAlCl$_4$), lithium hexafluorosilicate (Li$_2$SiF$_6$), lithium chloride (LiCl), lithium bromide (LiBr) or the like can be cited. Thereby, superior capacity characteristics, superior cycle characteristics, and superior storage characteristics can be obtained. Such a lithium salt may be used singly, or two or more thereof may be used by mixing. Specially, it is preferable that the electrolyte salt contains lithium hexafluorophospate. Thereby, the internal resistance is lowered, and thus higher effects can be obtained.

The electrolyte salt may contain the compound shown in Chemical formula 7, 8, or 9. Thereby, sufficient effects can be obtained. One thereof may be used singly, or two or more thereof may be used by mixing.

  Chemical formula 7 where m and n represent an integer number of 1 or more, and may be identical or different.

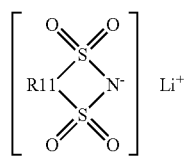  Chemical formula 8 where R11 represents a straight chain/branched perfluoro alkylene group with the carbon number in the range from 2 to 4.

  Chemical formula 9 where p, q, and r represent an integer number of 1 or more and may be identical or different.

As the chain compound shown in Chemical formula 7, for example, lithium bis(trifluoromethanesulfonyl)imide (LiN(CF$_3$SO$_2$)$_2$), lithium bis(pentafluoroethanesulfonyl)imide (LiN(C$_2$F$_5$ SO$_2$)$_2$), lithium (trifluoromethanesulfonyl) (pentafluoroethanesulfonyl)imide (LiN(CF$_3$SO$_2$)(C$_2$F$_5$SO$_2$)), lithium (trifluoromethanesulfonyl)(heptafluoropropanesulfonyl)imide (LiN(CF$_3$SO$_2$)(C$_3$F$_7$SO$_2$)), lithium (trifluoromethanesulfonyl)(nonafluorobutanesulfonyl)imide (LiN(CF$_3$SO$_2$)(C$_4$F$_9$SO$_2$)) or the like can be cited.

As the cyclic compound shown in Chemical formula 8, for example, a series of compounds shown in Chemical formula 10 can be cited. That is, lithium 1,2-perfluoroethanedisulfonylimide shown in Chemical formula 10(1), lithium 1,3-perfluoropropanedisulfonylimide shown in Chemical formula 10(2), lithium 1,3-perfluorobutanedisulfonylimide shown in Chemical formula 10(3), lithium 1,4-perfluorobutanedisulfonylimide shown in Chemical formula 10(4) or the like can be cited. Specially, the electrolyte salt preferably contains lithium 1,3 perfluoropropanedisulfonylimide shown in Chemical formula 10(2), since thereby sufficient effects can be obtained.

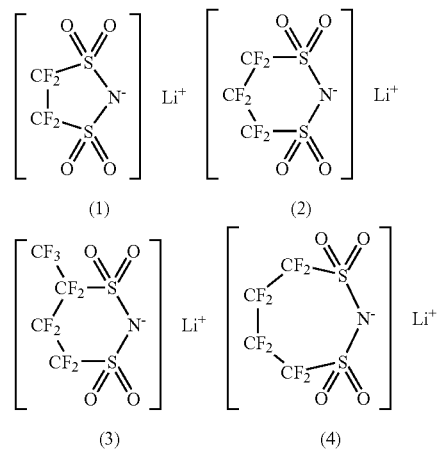  Chemical formula 10

As the chain compound shown in Chemical formula 9, for example, lithium tris(trifluoromethanesulfonyl)methide (LiC(CF$_3$SO$_2$)$_3$) or the like can be cited.

The content of the electrolyte salt is preferably in the range from 0.3 mol/kg to 3.0 mol/kg to the solvent. If out of the foregoing range, there is a possibility that the ion conductivity is significantly lowered and thus the capacity characteristics and the like are not able to be obtained sufficiently.

The secondary battery can be manufactured, for example, as follows.

First, for example, the cathode 21 is formed by forming the cathode active material layer 21B on the both faces of the cathode current collector 21A. The cathode active material layer 21B is formed, as follows. Cathode active material powder, an electrical conductor, and a binder are mixed to prepare a cathode mixture, which is dispersed in a solvent such as N-methyl-2-pyrrolidone to obtain paste cathode mixture slurry. Then, the cathode current collector 21A is coated with the cathode mixture slurry, which is dried, and the resultant is compression-molded. Further, for example, according to a procedure similar to that of the cathode 21, the anode 22 is formed by forming the anode active material layer 22B on the both faces of the anode current collector 22A.

Subsequently, the cathode lead 25 is attached to the cathode current collector 21A by being welded, and the anode lead 26 is attached to the anode current collector 22A by being welded. Subsequently, the cathode 21 and the anode 22 are spirally wound with the separator 23 in between, and thereby the spirally wound electrode body 20 is formed. The end of the cathode lead 25 is welded to the safety valve mechanism 15, and the end of the anode lead 26 is welded to the battery can 11. After that, the spirally wound electrode body 20 is sandwiched between the pair of insulating plates 12 and 13, and contained inside the battery can 11. Subsequently, an electrolytic solution is injected into the battery can 11 and impregnated in the separator 23. Finally, at the open end of the battery can 11, the battery cover 14, the safety valve mechanism 15, and the PTC device 16 are fixed by being caulked with the gasket 17. The secondary battery shown in FIG. 1 and FIG. 2 is thereby completed.

In the secondary battery, when charged, for example, lithium ions are extracted from the cathode 21 and inserted in the anode 22 through the electrolytic solution. Meanwhile, when discharged, for example, lithium ions are extracted from the anode 22, and inserted in the cathode 21 through the electrolytic solution.

According to the secondary battery, the anode 22 contains the material that can insert and extract the electrode reactant and contains at least one of a metal element and a metalloid element as an element. In addition, the electrolytic solution contains the sulfone compound shown in Chemical formula 1. Therefore, compared to a case in which the electrolytic solution does not contain the sulfone compound, the decomposition reaction of the electrolytic solution is suppressed. Further, the electrolytic solution contains the sulfone compound shown in Chemical formula 1 when the anode 22 contains the foregoing material. Therefore, compared to a case that the anode 22 contains a carbon material or the like, the decomposition inhibition effects for the electrolytic solution become large. Therefore, the electrolytic solution becomes sufficiently stable electrochemically, and thus the cycle characteristics and the storage characteristics can be improved. In this case, when the content of the sulfone compound shown in Chemical formula 1 in the electrolytic solution is in the range from 0.01 wt % to 5 wt %, the characteristics can be further improved. Further, when the anode 22 contains at least one of the simple substance, an alloy, and a compound of silicon, the simple substance, an alloy, and a compound of tin, improvement of the cycle characteristics and the storage characteristics is strongly demanded. Even in this case, higher effects can be obtained.

In particular, when the solvent contains the chain ester carbonate having a halogen as an element shown in Chemical formula 3 or the cyclic ester carbonate having a halogen as an element shown in Chemical formulas 4 to 6, or when the solvent contains the ester carbonate having a saturated bond, higher effects can be obtained. Further, when the electrolyte salt contains lithium hexafluorophospate or the like, and further contains the compound shown in Chemical formulas 7 to 10, the characteristics can be more improved.

Next, a description will be given of another embodiment of the application. For the element common to those of the first embodiment, the same referential symbols are affixed thereto, and the description thereof will be omitted.

Second Embodiment

A battery according to a second embodiment has a structure, operations, and effects similar to those of the battery of a foregoing first embodiment, except that the structure of the anode 22 is different, and can be manufactured by a procedure similar to that of the first embodiment.

The anode 22 has a structure in which the anode active material layer 22B is provided on the both faces of the anode current collector 22A similarly to in the battery of the first embodiment. The anode active material layer 22B contains an anode active material containing, for example, silicon or tin as an element. Silicon and tin have a high ability to insert and extract lithium, and can provide a high energy density. In particular, silicon is preferable since silicon has the theoretical capacity larger than that of tin. Specifically, for example, the anode active material layer 22B contains the simple substance, an alloy, or a compound of silicon, or the simple substance, an alloy, or a compound of tin. The anode active material layer 22B may contain two or more thereof.

The anode active material layer 22B may be formed by using, for example, vapor-phase deposition method, liquid-phase deposition method, spraying method, firing method, or two or more of these methods. The anode active material layer 22B and the anode current collector 22A are preferably alloyed at the interface thereof at least in part. Specifically, it is preferable that at the interface thereof, the element of the anode current collector 22A is diffused in the anode active material layer 22B, or the element of the anode active material layer 22B is diffused in the anode current collector 22A, or both elements are diffused therein each other. Thereby, destruction due to expansion and shrinkage of the anode active material layer 22B due to charge and discharge can be prevented, and electron conductivity between the anode active material layer 22B and the anode current collector 22A can be improved.

As vapor-phase deposition method, for example, physical deposition method or chemical deposition method can be cited. Specifically, vacuum vapor deposition method, sputtering method, ion plating method, laser ablation method, thermal CVD (Chemical Vapor Deposition) method, plasma CVD method and the like can be cited. As liquid-phase deposition method, a known technique such as electrolytic plating and electroless plating can be used. Firing method is, for example, a method in which a particulate anode active material, a binder and the like are mixed and dispersed in a solvent, and then the anode current collector 22A is coated with the mixture, and the resultant is heat-treated at a temperature higher than the melting point of the binder and the like. For firing method, a known technique such as atmosphere firing method, reactive firing method, and hot press firing method can be cited.

Third Embodiment

Figure 3:
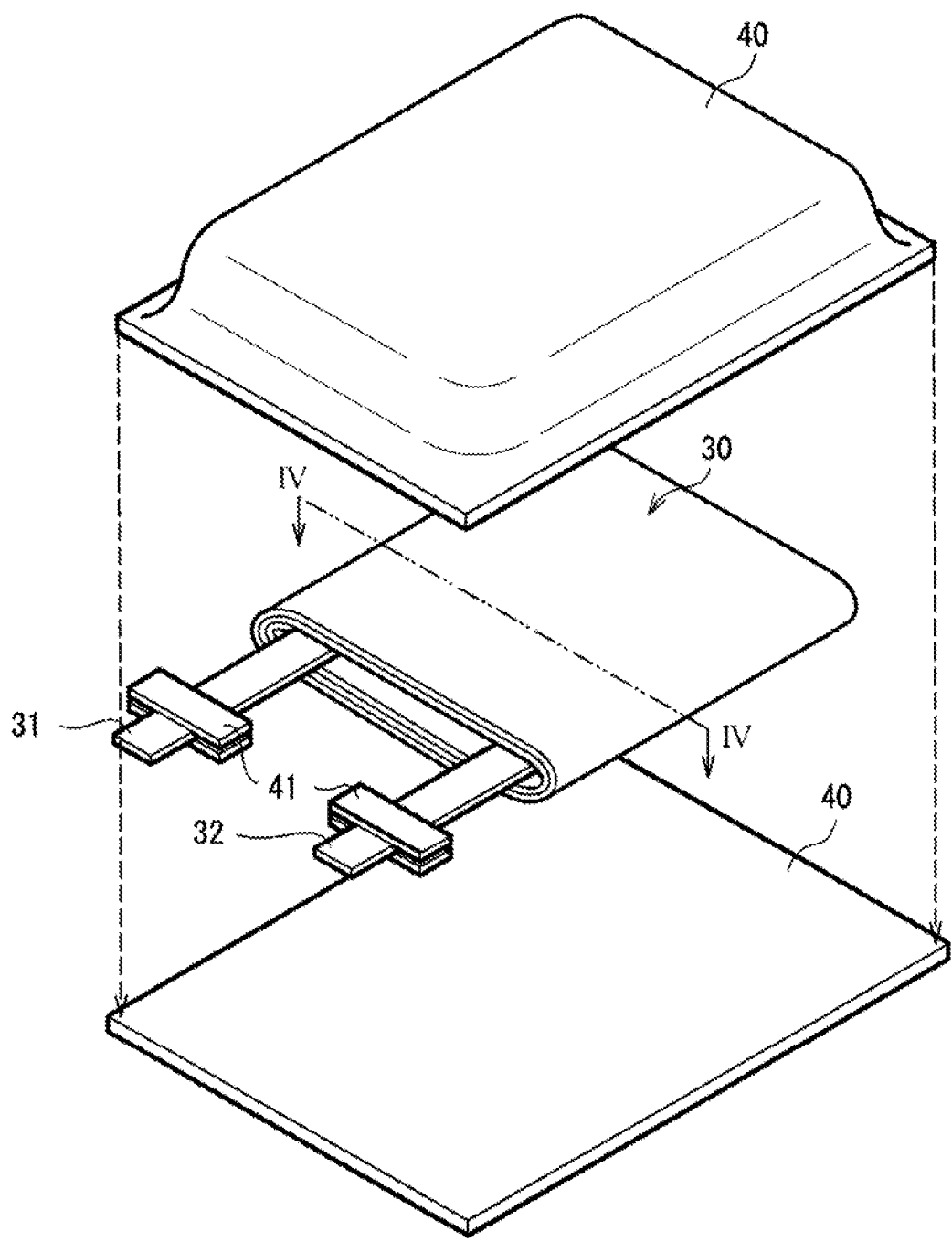
FIG. 3 is an exploded perspective view showing a structure of a battery using an electrolytic solution according to a third embodiment.

FIG. 3 shows an exploded perspective structure of a battery according to a third embodiment. In the battery, a spirally wound electrode body 30 on which a cathode lead 31 and an anode lead 32 are attached is contained inside a film-shaped package member 40. The battery structure is a so-called laminated type secondary battery.

The cathode lead 31 and the anode lead 32 are respectively directed from inside to outside of the package member 40 in the same direction, for example. The cathode lead 31 and the anode lead 32 are respectively made of, for example, a metal material such as aluminum, copper, nickel, and stainless, and are in the shape of a thin plate or mesh.

The package member 40 is made of a rectangular aluminum laminated film in which, for example, a nylon film, an aluminum foil, and a polyethylene film are bonded together in this order. The package member 40 is, for example, arranged so that the polyethylene film and the spirally wound electrode body 30 are opposed, and the respective outer edges are contacted to each other by fusion bonding or an adhesive. An adhesive film 41 to protect from entering of outside air is inserted between the package member 40 and the cathode lead 31, the anode lead 32. The adhesive film 41 is made of a material having contact characteristics to the cathode lead 31 and the anode lead 32, for example, is made of a polyolefin resin such as polyethylene, polypropylene, modified polyethylene, and modified polypropylene.

The package member 40 may be made of a laminated film having other structure, a polymer film such as polypropylene, or a metal film, instead of the foregoing three-layer aluminum laminated film.

Figure 4:
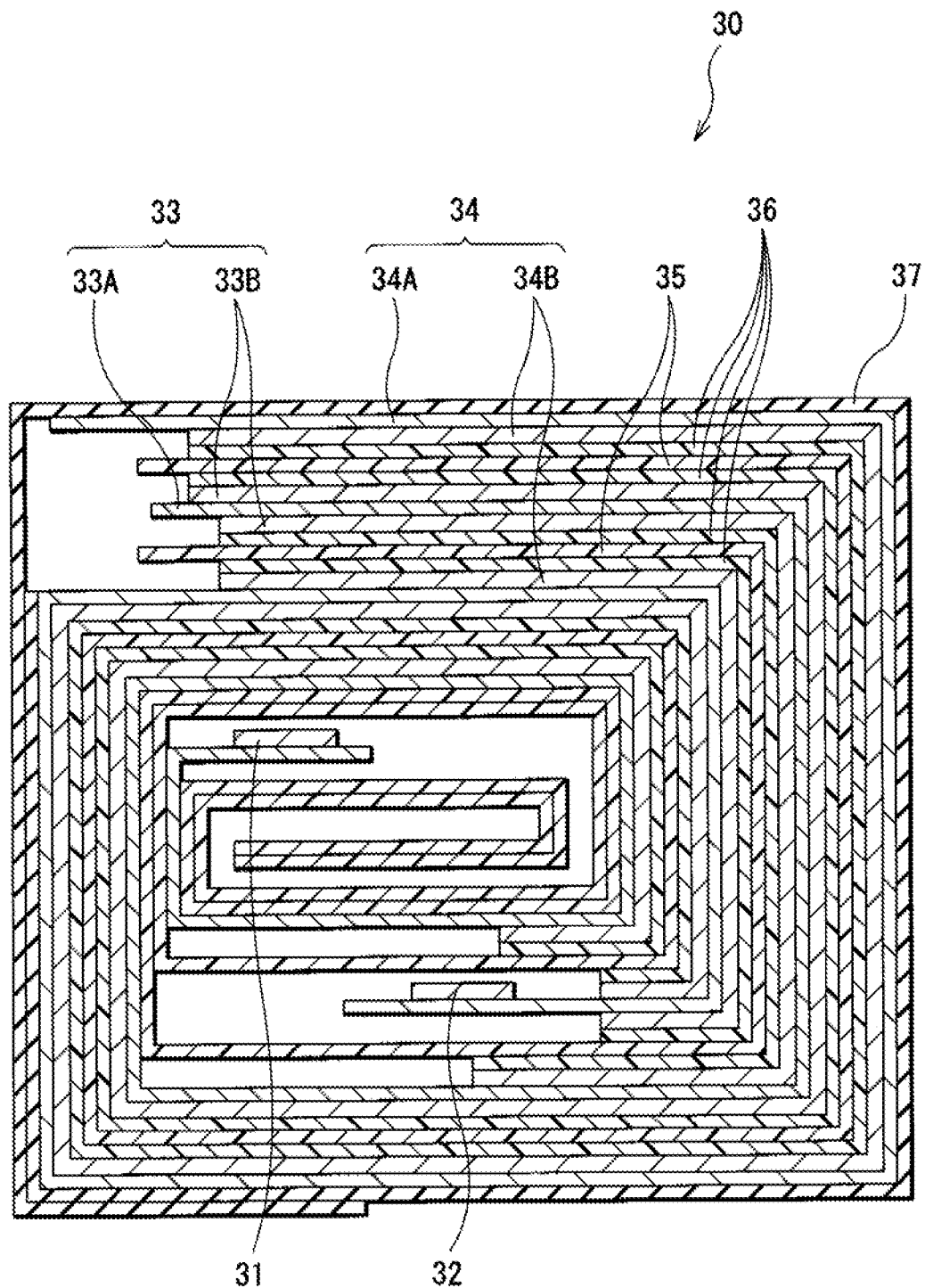
FIG. 4 is a cross section showing a structure taken along line IV-IV of a spirally wound electrode body shown in FIG. 3.

FIG. 4 shows a cross sectional structure taken along line IV-IV of the spirally wound electrode body 30 shown in FIG. 3. In the spirally wound electrode body 30, a cathode 33 and an anode 34 are layered with a separator 35 and an electrolyte 36 in between and then spirally wound. The outermost periphery thereof is protected by a protective tape 37.

The cathode 33 has a structure in which a cathode active material layer 33B is provided on the both faces of a cathode current collector 33A. The anode 34 has a structure in which an anode active material layer 34B is provided on the both faces of an anode current collector 34A. Arrangement is made so that the anode active material layer 34B is opposed to the cathode active material layer 33B. The structures of the cathode current collector 33A, the cathode active material layer 33B, the anode current collector 34A, the anode active material layer 34B, and the separator 35 are similar to those of the cathode current collector 21A, the cathode active material layer 21B, the anode current collector 22A, the anode active material layer 22B, and the separator 23 of the batteries in the first and the second embodiments.

The electrolyte 36 is so-called gelatinous, containing an electrolytic solution and a polymer compound that holds the electrolytic solution. The gel electrolyte is preferable, since high ion conductivity (for example, 1 mS/cm or more at room temperature) can be obtained and liquid leakage of the battery can be prevented.

As the polymer compound, for example, polyacrylonitrile, polyvinylidene fluoride, a copolymer of polyvinylidene fluoride and polyhexafluoropropylene, polytetrafluoroethylene, polyhexafluoropropylene, polyethylene oxide, polypropylene oxide, polyphosphazene, polysiloxane, polyvinyl acetate, polyvinyl alcohol, polymethylmethacrylate, polyacrylic acid, polymethacrylic acid, styrene-butadiene rubber, nitrile-butadiene rubber, polystyrene, polycarbonate or the like can be cited. One thereof may be used singly, or two or more thereof may be used by mixing. In particular, in terms of electrochemical stability, polyacrylonitrile, polyvinylidene fluoride, polyhexafluoropropylene, polyethylene oxide or the like is preferably used. The content of the polymer compound in the electrolytic solution varies according to the compatibility thereof, and for example, is preferably in the range from 5 wt % to 50 wt %.

The composition and the content of the electrolytic solution are similar to those of the electrolytic solution in the battery of the first embodiment. However, in this case, the solvent means a wide concept including not only the liquid solvent but also a solvent having ion conductivity capable of dissociating the electrolyte salt. Therefore, when the polymer compound having ion conductivity is used, the polymer compound is also included in the solvent.

As the electrolyte 36, instead of the electrolyte in which the electrolytic solution is held by the polymer compound, the electrolytic solution can be directly used. In this case, the electrolytic solution is impregnated in the separator 35.

The secondary battery can be manufactured, for example, as follows.

First, a precursor solution containing an electrolytic solution, a polymer compound, and a mixed solvent is prepared. Then, the cathode 33 and the anode 34 are respectively coated with the precursor solution. After that, the mixed solvent is volatilized to form the electrolyte 36. Subsequently, the cathode lead 31 is attached to the cathode current collector 33A, and the anode lead 32 is attached to the anode current collector 34A. Subsequently, the cathode 33 and the anode 34 formed with the electrolyte 36 are layered with the separator 35 in between to obtain a lamination. After that, the lamination is spirally wound in the longitudinal direction, the protective tape 37 is adhered to the outermost periphery thereof to form the spirally wound electrode body 30. Subsequently, for example, the spirally wound electrode body 30 is sandwiched between the package members 40, and outer edges of the package members 40 are contacted by thermal fusion bonding or the like to enclose the spirally wound electrode body 30. Then, the adhesive film 41 is inserted between the cathode lead 31/the anode lead 32 and the package member 40. Thereby, the secondary battery shown in FIG. 3 and FIG. 4 is completed.

Otherwise, the secondary battery may be fabricated as follows. First, the cathode lead 31 and the anode lead 32 are attached on the cathode 33 and the anode 34, respectively. After that, the cathode 33 and the anode 34 are layered with the separator 35 in between and spirally wound. The protective tape 37 is adhered to the outermost periphery thereof, and a spirally wound body as a precursor of the spirally wound electrode body 30 is formed. Subsequently, the spirally wound body is sandwiched between the package members 40, the peripheral edges except one side are thermally fusion-bonded to obtain a pouched state, and the spirally wound body is contained inside the pouched-like package member 40. Subsequently, a composition of matter for electrolyte containing an electrolytic solution, a monomer as a raw material for a polymer compound, a polymerization initiator, and if necessary other material such as a polymerization inhibitor is prepared, which is injected into the pouched-like package member 40. After that, the opening of the package member 40 is hermetically sealed by, for example, thermal fusion bonding or the like. Finally, the monomer is thermally polymerized to obtain a polymer compound. Thereby, the gel electrolyte 36 is formed, and thereby the secondary battery shown in FIG. 3 and FIG. 4 is completed.

The operations and the effects of the secondary battery are similar to those of the first or the second embodiment.

EXAMPLES

Specific examples of the application will be described in detail.

(1) First, secondary batteries were fabricated by using silicon as an anode active material with the use of electron beam deposition method as a method of forming the anode active material layer.

Examples 1-1 to 1-4

The laminated film type secondary batteries shown in FIG. 3 and FIG. 4 were fabricated. At that time, the secondary batteries were fabricated as a lithium ion secondary battery in which the capacity of the anode 34 was expressed by the capacity component based on insertion and extraction of lithium.

First, the cathode 33 was formed. That is, lithium carbonate ($Li_2CO_3$) and cobalt carbonate ($CoCO_3$) were mixed at a molar ratio of 0.5:1. After that, the mixture was fired in the air at 900 deg C. for 5 hours. Thereby, lithium cobalt complex oxide ($LiCoO_2$) was obtained. Subsequently, 91 parts by weight of the lithium cobalt complex oxide as a cathode active material, 6 parts by weight of graphite as an electrical conductor, and 3 parts by weight of polyvinylidene fluoride (PVDF) as a binder were mixed to obtain a cathode mixture. After that, the mixture was dispersed in N-methyl-2-pyrrolidone as a solvent to obtain paste cathode mixture slurry. Finally, the both faces of the cathode current collector 33A made of a strip-shaped aluminum foil being 12 μm thick were coated with the cathode mixture slurry, which was dried. Then, the resultant was compression-molded by a roll pressing machine to form the cathode active material layer 33B. After that, the cathode lead 31 made of aluminum was welded to one end of the cathode current collector 33A.

The anode active material layer 34B made of silicon was formed on the both faces of the anode current collector 34A made of a copper foil by electron beam deposition method, and thereby the anode 34 was formed. After that, the anode lead 32 made of nickel was attached to one end of the anode current collector 34A.

Subsequently, the cathode 33, the separator 35 made of a micro porous polypropylene film being 25 μm thick, and the anode 34 were layered in this order. After that, the resultant lamination was spirally wound many times in the longitudinal direction, the end portion of the spirally wound body was fixed by a protective tape 37 made of an adhesive tape, and thereby a spirally wound body as a precursor of the spirally wound electrode body 30 was formed. Subsequently, the spirally wound body was inserted between the package members 40 made of a laminated film having 3-layer structure (total thickness: 100 μm) in which nylon being 30 μm thick, an aluminum foil being 40 μm thick, and non-stretched polypropylene being 30 μm thick were layered from the outside. After that, the outer edges except the edge of one side of the package members 40 were thermally fusion-bonded to each other. Thereby, the spirally wound body was contained inside the package members 40 in a pouched state. Subsequently, an electrolytic solution was injected through the opening of the package member 40, the electrolytic solution as the electrolyte 36 was impregnated in the separator 35, and thereby the spirally wound electrode body 30 was formed.

As an electrolytic solution, an electrolytic solution containing a mixed solvent of ethylene carbonate (EC) and diethyl carbonate (DEC); lithium hexafluorophospate ($LiPF_6$) as an electrolyte salt; and the sulfone compound of Chemical formula 2(1) as the sulfone compound shown in Chemical formula 1 was used. The composition of the mixed solvent at that time was EC:DEC=30:70 at a weight ratio, and the concentration of $LiPF_6$ in the electrolytic solution was 1 mol/kg. The content of the sulfone compound of Chemical formula 2(1) in the electrolytic solution was 0.01 wt % (Example 1-1), 1 wt % (Example 1-2), 2 wt % (Example 1-3), and 5 wt % (Example 1-4). "wt %" means the value where the total of the solvent and the sulfone compound was 100 wt %. The meaning of "wt %" is similarly used in the following descriptions.

Finally, the opening of the package member 40 was thermally fusion bonded and sealed in the vacuum atmosphere. Thereby, the laminated film type secondary battery was completed.

Example 1-5

A procedure was performed in the same manner as that of Example 1-2, except that ethyl methyl carbonate (EMC) was used instead of DEC as a solvent.

Example 1-6

A procedure was performed in the same manner as that of Example 1-2, except that 4-fluoro-1,3-dioxolane-2-one (FEC) was used instead of EC as a solvent.

Example 1-7

A procedure was performed in the same manner as that of Example 1-2, except that propylene carbonate (PC) was further added as a solvent. The composition of the mixed solvent was EC:DEC:PC=10:70:20 at a weight ratio.

Example 1-8

A procedure was performed in the same manner as that of Example 1-2, except that 5 wt % of FEC was further added as a solvent.

Example 1-9

A procedure was performed in the same manner as that of Example 1-2, except that 5 wt % of trans-4,5-fluoro-1,3-dioxolane-2-one (trans-DFEC) was further added as a solvent.

Example 1-10

A procedure was performed in the same manner as that of Example 1-2, except that 5 wt % of cis-4,5-fluoro-1,3-dioxolane-2-one (cis-DFEC) was further added as a solvent.

Example 1-11

A procedure was performed in the same manner as that of Example 1-2, except that 2 wt % of vinylene carbonate (VC) was further added as a solvent.

Example 1-12

A procedure was performed in the same manner as that of Example 1-2, except that the sulfone compound of Chemical formula 2(2) was used as the sulfone compound shown in Chemical formula 1, instead of the sulfone compound of Chemical formula 2(1).

Comparative Example 1-1

A procedure was performed in the same manner as that of Examples 1-1 to 1-4, except that the sulfone compound of Chemical formula 2(1) was not contained in the electrolytic solution.

Comparative Examples 1-2 to 1-4

A procedure was performed respectively in the same manner as that of Examples 1-6, 1-9, and 1-11, except that the sulfone compound of Chemical formula 2(1) was not contained in the electrolytic solution.

When the ambient temperature cycle characteristics and the high temperature storage characteristics of the secondary batteries of Examples 1-1 to 1-12 and Comparative examples 1-1 to 1-4 were examined, the results shown in Table 1 were obtained.

In examining the ambient temperature cycle characteristics, the secondary battery was repeatedly charged and discharged by the following procedure, and the discharge capacity retention ratio was calculated. First, charge and discharge were performed 2 cycles in the atmosphere of 23 deg C. After that, the discharge capacity at the second cycle was obtained. Subsequently, charge and discharge were performed in the same atmosphere until the total number of cycles became 100 cycles. After that, the discharge capacity at the 100th cycle was obtained. Thereby, the discharge capacity retention ratio (%)=(discharge capacity at the 100th cycle/discharge capacity at the second cycle)×100 was calculated. The charge and discharge condition of 1 cycle was as follows. That is, after constant current and constant voltage charge were performed at the charge current of 0.2 C until the upper limit voltage of 4.2 V, and then constant current discharge was performed at the discharge current of 0.2 C until the final voltage of 2.5 V. "0.2 C" means the current value at which the theoretical capacity is completely discharged in 5 hours.

In examining the high temperature storage characteristics, the secondary battery was stored at high temperature by the following procedure, and then the discharge capacity retention ratio was calculated. First, charge and discharge were performed 2 cycles in the atmosphere of 23 deg C. After that, the discharge capacity at the second cycle (discharge capacity before being stored at high temperature) was obtained. Subsequently, the secondary battery was stored for 10 days in a constant temperature bath at 80 deg C. in a state of being charged again. After that, the secondary battery was discharged in the atmosphere of 23 deg C., and thereby the discharge capacity (discharge capacity after being stored at high temperature) was obtained. Thereby, the discharge capacity retention ratio (%)=(discharge capacity after being stored at high temperature/discharge capacity before being stored at high temperature)×100 was calculated. The charge and discharge condition of 1 cycle was similar to that of the case examining the ambient temperature cycle characteristics.

The foregoing procedures, conditions and the like in examining the ambient temperature cycle characteristics and the high temperature storage characteristics were similar to those in evaluating the same characteristics for the following examples and comparative examples.

sulfone compound of Chemical formula 2(1) in Examples 1-1 to 1-4 in which the foregoing result was obtained were respectively 0.01 wt % and 5 wt %. In particular, in Example 1-2 using the sulfone compound of Chemical formula 2(1), the discharge capacity retention ratios of the ambient temperature cycle characteristics and the high temperature storage characteristics were higher than those of in Example 1-12 using the sulfone compound of Chemical formula 2(2). Therefore, it was confirmed that in the secondary battery in which the anode 34 contained silicon as an anode active material (electron beam deposition method), the cycle characteristics and the storage characteristics were improved when the electrolytic solution contained the sulfone compound shown in Chemical formula 1. It was also confirmed that in that case, the content of the sulfone compound shown in Chemical formula 1 in the electrolytic solution was preferably in the range from 0.01 wt % to 5 wt %.

Further, in Example 1-5 in which EMC was used instead of DEC as the solvent, in Example 1-6 in which FEC was used

TABLE 1

Anode active material: Si (electron beam deposition method)

| | Electrolyte | | Sulfone compound | | Discharge capacity retention ratio (%) | |
| | | | | | Ambient temperature cycle | High temperature storage |
| | salt | Solvent | Kind | wt % | characteristics | characteristics |
|---|---|---|---|---|---|---|
| Example 1-1 | | EC + DEC | Chemical formula 2(1) | 0.01 | 55 | 80 |
| Example 1-2 | | | | 1 | 62 | 85 |
| Example 1-3 | | | | 2 | 62 | 86 |
| Example 1- | | | | 5 | 56 | 86 |
| Example 1-5 | | EC + EMC | | 1 | 60 | 84 |
| Example 1-6 | | FEC + DEC | | | 82 | 87 |
| Example 1-7 | | EC + DEC + PC | | | 62 | 86 |
| Example 1-8 | LiPF$_6$ 1.0 mol/kg | EC + DEC | FEC 5 wt % | | 74 | 85 |
| Example 1-9 | | | Trans-DFEC 5 wt % | | 86 | 88 |
| Example 1-10 | | | Cis-DFEC 5 wt % | | 86 | 88 |
| Example 1-11 | | | VC 2 wt % | | 74 | 85 |
| Example 1-1 | | | — | Chemical formula 2(2) | 60 | 84 |
| Comparative example 1-1 | LiPF$_6$ 1.0 mol/kg | EC + DEC | — | | 52 | 74 |
| Comparative example 1-2 | | FEC + DEC | | | 80 | 78 |
| Comparative example 1-3 | | EC + DEC | Trans-DFEC 5 wt % | | 82 | 80 |
| Comparative example 1-4 | | | VC 2 wt % | | 70 | 76 |

As show in Table 1, in Examples 1-1 to 1-4 and 1-12 in which the electrolytic solution contained the sulfone compound of Chemical formula 2(1) or the sulfone compound of Chemical formula 2(2), the discharge capacity retention ratios of the ambient temperature cycle characteristics and the high temperature storage characteristics were higher than those of Comparative example 1-1 in which the electrolytic solution did not contain the sulfone compound of Chemical formula 2(1) or the sulfone compound of Chemical formula 2(2). The upper limit and the lower limit of the content of the instead of EC as the solvent, and in Example 1-7 in which PC was used in addition to EC and DEC as the solvent, the discharge capacity retention ratios of the ambient temperature cycle characteristics and the high temperature storage characteristics were higher than those of Comparative example 1-1, and almost equal to or more than those of Example 1-2. It is needless to say that in Example 1-6, the discharge capacity retention ratio was higher than that of Comparative example 1-2. In particular, among Examples 1-5 to 1-7, in Example 1-6 in which the solvent contained FEC, the discharge capacity retention ratios of the ambient temperature cycle characteristics and the high temperature storage characteristics were extremely high. Thereby, it was confirmed that in the secondary battery in which the electrolytic solution contained the sulfone compound shown in Chemical formula 1, the cycle characteristics and the storage characteristics were improved even when the solvent composition was changed. It was also confirmed that when the solvent contained FEC, higher effects could be obtained.

Further, in Examples 1-8 to 1-11 in which FEC, trans-DFEC, cis-DFEC, VC was respectively added to EC and DEC as the solvent, the discharge capacity retention ratios of the ambient temperature cycle characteristics and the high temperature storage characteristics were higher than those of Comparative example 1-1, and almost equal to or more than those of Example 1-2. It is needless to say that in Examples 1-9 and 1-11, the discharge capacity retention ratio was higher than that of Comparative examples 1-3 and 1-4. In particular, in Examples 1-9 and 1-10 in which the solvent contained trans-DFEC or cis-DFEC, the discharge capacity retention ratios of the ambient temperature cycle characteristics and the high temperature storage characteristics were higher than those of Examples 1-8 and 1-11 in which the solvent contained FEC or VC. Thereby, it was confirmed that in the secondary battery in which the electrolytic solution contained the sulfone compound shown in Chemical formula 1, higher effects could be obtained when the solvent contained the cyclic ester carbonate having a halogen as an element shown in Chemical formula 4 or cyclic ester carbonate having an unsaturated bond. It was also confirmed that when the solvent contained DFEC, higher effects could be obtained. Examples for a case in which a solvent contained the chain ester carbonate having a halogen as an element shown in Chemical formula 3 is not herein disclosed. However, in such a case, since the chain ester carbonate having a halogen as an element shown in Chemical formula 3 has physical properties similar to those of the cyclic ester carbonate having a halogen as an element shown in Chemical formula 4 in terms of decomposition inhibition of the electrolytic solution, it is evident that the above-mentioned effects can be also obtained in the case that the chain ester carbonate having a halogen as an element shown in Chemical formula 3 is used.

Example 2-1

A procedure was performed in the same manner as that of Example 1-9, except that lithium tetrafluoroborate ($LiBF_4$) was further added as an electrolyte salt, and the concentrations of $LiPF_6$ and $LiBF_4$ in the electrolytic solution were respectively 0.9 mol/kg and 0.1 mol/kg.

Example 2-2

A procedure was performed in the same manner as that of Example 2-1, except that lithium bis(trifluoromethanesulfonyl)imide (LiTFSI) was added instead of $LiBF_4$ as an electrolyte salt.

Example 2-3

A procedure was performed in the same manner as that of Example 2-1, except that lithium 1,3-perfluoropropanedisulfonylimide shown in Chemical formula 10(2) was added instead of $LiBF_4$ as an electrolyte salt.

When the ambient temperature cycle characteristics and the high temperature storage characteristics were examined for the secondary batteries of Examples 2-1 to 2-3, the results shown in Table 2 were obtained. In Table 2, the characteristics of Example 1-9 and Comparative example 1-3 are shown together.

TABLE 2

| | Anode active material: Si (electron beam deposition method) | | | | | | |
|---|---|---|---|---|---|---|---|
| | | | | | | Discharge capacity retention ratio (%) | |
| | | | | Sulfone compound | | Ambient temperature cycle | High temperature storage |
| | Electrolyte salt | | Solvent | Kind | wt % | characteristics | characteristics |
| Example 1-9 | $LiPF_6$ 1.0 mol/kg | | EC + DEC | Trans-DFEC 5 wt % | Chemical formula 2(1) | 1 | 86 | 88 |
| Example 2-1 | $LiPF_6$ 0.9 mol/kg | $LiBF_4$ 0.1 mol/kg | | | | | 86 | 90 |
| Example 2-2 | | LiTFSI 0.1 mol/kg | | | | | 86 | 89 |
| Example 2-3 | | Chemical formula 10(2) 0.1 mol/kg | | | | | 86 | 90 |
| Comparative example 1-3 | $LiPF_6$ 1.0 mol/kg | | EC + DEC | Trans-DFEC 5 wt % | — | — | 82 | 80 |

As shown in Table 2, in Examples 2-1 to 2-3 in which the electrolytic solution contained the sulfone compound of Chemical formula 2(1), the discharge capacity retention ratios of the ambient temperature cycle characteristics and the high temperature storage characteristics were higher than those of Comparative example 1-3 in which the electrolytic solution did not contain the sulfone compound of Chemical formula 2(1), and equal to or more than those of Example 1-9. Therefore, it was confirmed that in the secondary battery in which the anode 34 contained silicon as an anode active material (electron beam deposition method) and the electrolytic solution contained the sulfone compound shown in Chemical formula 1, the cycle characteristics and the storage characteristics were secured even when the composition of the electrolyte salt was changed.

(2) Next, secondary batteries were fabricated by using silicon as an anode active material with the use of sintering method as a method of forming the anode active material layer.

Examples 3-1 to 3-12

A procedure was performed in the same manner as that of Examples 1-1 to 1-12, except for the procedure of forming the anode 34. The anode 34 was formed as follows. First, 90 parts by weight of silicon powder with the average particle diameter of 2 μm as an anode active material and 10 parts by weight of polyvinylidene fluoride as a binder were mixed. The mixture was dispersed in N-methyl-2-pyrrolidone as a solvent. After that, the both faces of the anode current collector 22A made of a copper foil being 20 μm thick were coated with the resultant mixture, which was dried. Subsequently, the resultant was compression-molded so that the thickness of a single face of the anode active material layer 34B became 15 μm. Finally, the resultant was heated at 350 deg C. for 3 hours, cooled, and cut in a state of a strip.

Comparative Examples 3-1 to 3-4

A procedure was performed in the same manner as that of Comparative examples 1-1 to 1-4, except that the anode active material layer 34B containing silicon was formed on the both faces of the anode current collector 34A by sintering method in the same manner as in Examples 3-1 to 3-12.

When the ambient temperature cycle characteristics and the high temperature storage characteristics were examined for the secondary batteries of Examples 3-1 to 3-12 and Comparative examples 3-1 to 3-4, the results shown in Table 3 were obtained.

As shown in Table 3, in Examples 3-1 to 3-4 and 3-12, the discharge capacity retention ratios of the ambient temperature cycle characteristics and the high temperature storage characteristics were higher than those in Comparative example 3-1. In Example 3-2, the discharge capacity retention ratios of the ambient temperature cycle characteristics and the high temperature storage characteristics were higher than those in Example 3-12. The lower limit and the upper limit of the content of sulfone compound of Chemical formula 2(1) in Examples 3-1 to 3-4 in which the foregoing result was obtained were respectively 0.01 wt % and 5 wt %. Therefore, it was confirmed that in the secondary battery in which the anode 34 contained silicon as an anode active material (sintering method), the cycle characteristics and the storage characteristics were secured when the electrolytic solution contained the sulfone compound shown in Chemical formula 1. Further, it was confirmed that the content of the sulfone compound shown in Chemical formula 1 was preferably in the range from 0.01 wt % to 5 wt %.

Further, in Examples 3-5 to 3-7, the discharge capacity retention ratios of the ambient temperature cycle characteristics and the high temperature storage characteristics were higher than those in Comparative example 3-1, and almost equal to those of Example 3-2. It is needless to say that the discharge capacity retention ratio of Example 3-6 was higher than that of Comparative example 3-2. In particular, among Examples 3-5 to 3-7, in Example 3-6 in which the solvent contained FEC, the discharge capacity retention ratios of the ambient temperature cycle characteristics and the high temperature storage characteristics were extremely high. Thereby, it was confirmed that in the secondary battery in which the electrolytic solution contained the sulfone com-

TABLE 3

Anode active material: Si (sintering method)

| | Electrolyte salt | Solvent | Sulfone compound | | Discharge capacity retention ratio (%) | |
| --- | --- | --- | --- | --- | --- | --- |
| | | | Kind | wt % | Ambient temperature cycle characteristics | High temperature storage characteristics |
| Example 3-1 | | EC + DEC | — | 0.01 | 50 | 80 |
| Example 3-2 | | | Chemical formula 2(1) | 1 | 56 | 84 |
| Example 3-3 | | | | 2 | 60 | 86 |
| Example 3-4 | | | | 5 | 52 | 86 |
| Example 3-5 | | EC + EMC | | 1 | 54 | 83 |
| Example 3-6 | | FEC + DEC | | | 78 | 86 |
| Example 3-7 | | EC + DEC + PC | | | 56 | 85 |
| Example 3-8 | LiPF$_6$ 1.0 mol/kg | EC + DEC | FEC 5 wt % | | 70 | 85 |
| Example 3-9 | | | Trans-DFEC 5 wt % | | 82 | 88 |
| Example 3-10 | | | Cis-DFEC 5 wt % | | 82 | 88 |
| Example 3-11 | | | VC 2 wt % | | 69 | 85 |
| Example 3-12 | | | Chemical formula 2(2) | | 55 | 83 |
| Comparative example 3-1 | LiPF$_6$ 1.0 mol/kg | EC + DEC | — | | 45 | 75 |
| Comparative example 3-2 | | FEC + DEC | | | 76 | 79 |
| Comparative example 3-3 | | EC + DEC | Trans-DFEC 5 wt % | | 78 | 82 |
| Comparative example 3-4 | | | VC 2 wt % | | 64 | 77 | pound shown in Chemical formula 1, the cycle characteristics and the storage characteristics were secured even when the solvent composition was changed. It was also confirmed that when the solvent contained FEC, higher effects could be obtained.

Further, in Examples 3-8 to 3-11, the discharge capacity retention ratios of the ambient temperature cycle characteristics and the high temperature storage characteristics were higher than those of Comparative examples 3-1 and 3-2. It is needless to say that in Examples 3-9 and 3-11, the discharge capacity retention ratio was higher than those of Comparative examples 3-3 and 3-4. In particular, in Examples 3-9 and 3-10 in which the solvent respectively contained trans-DFEC or cis DFEC, the discharge capacity retention ratios of the ambient temperature cycle characteristics and the high temperature storage characteristics were higher than those of Examples 3-8 and 3-11 in which the solvent respectively contained FEC or VC. Thereby, it was confirmed that in the secondary battery in which the electrolytic solution contained the sulfone compound shown in Chemical formula 1, when the solvent contained the cyclic ester carbonate having a halogen as an element shown in Chemical formula 3 or the cyclic ester carbonate having an unsaturated bond, higher effects could be obtained. Further, it was confirmed that in such a secondary battery, when the solvent contained DFEC, higher effects could be obtained.

Examples 4-1 to 4-3

A procedure was performed in the same manner as that of Examples 2-1 to 2-3, except that the anode active material layer 34B was formed by the procedure explained in Examples 3-1 to 3-12.

When the ambient temperature cycle characteristics and the high temperature storage characteristics were examined for the secondary batteries of Examples 4-1 to 4-3, the results shown in Table 4 were obtained. In Table 4, the characteristics of Example 3-9 and Comparative example 3-3 are shown together.

characteristics and the high temperature storage characteristics were higher than those of Comparative example 3-3, and equal to or more than those of Example 3-9. Therefore, it was confirmed that in the secondary battery in which the anode 34 contained silicon as an anode active material (sintering method) and the electrolytic solution contained the sulfone compound shown in Chemical formula 1, the cycle characteristics and the storage characteristics were secured even when the composition of the electrolyte salt was changed.

(3) Finally, by fabricating a secondary battery with the use of a carbon material as an anode active material, the characteristics were compared to those when the secondary battery was fabricated with the use of silicon as an anode active material.

Comparative Example 5-1

A procedure was performed in the same manner as that of Example 1-2, except for the procedure of forming the anode 34. The anode 34 was formed as follows. 90 parts by weight of artificial graphite powder as an anode active material and 10 parts by weight of PVDF as a binder were mixed to obtain an anode mixture. After that, the anode mixture was dispersed in N-methyl-2-pyrrolidone as a solvent and thereby paste anode mixture slurry was obtained. Subsequently, the both faces of the anode current collector 34A made of a strip-shaped copper foil being 15 µm thick were coated with the anode mixture slurry, which was dried. After that, the resultant was compression-molded by a rolling press machine to obtain the anode active material layer 34B.

Comparative Example 5-2

A procedure was performed in the same manner as that of Comparative example 5-1, except that the electrolytic solution did not contain the sulfone compound shown in Chemical formula 2(1).

When the ambient temperature cycle characteristics and the high temperature storage characteristics were examined

TABLE 4

Anode active material: Si (sintering method)

| | Electrolyte salt | | Solvent | Sulfone compound Kind | wt % | Discharge capacity retention ratio (%) Ambient temperature cycle characteristics | High temperature storage characteristics |
|---|---|---|---|---|---|---|---|
| Example 3-9 | LiPF$_6$ 1.0 mol/kg | | EC + DEC | Trans-DFEC 5 wt % | Chemical formula 2(1) | 1 | 82 | 88 |
| Example 4-1 | LiPF$_6$ 0.9 mol/kg | LiBF$_4$ 0.1 mol/kg | | | | | 82 | 90 |
| Example 4-2 | | LiTFSI 0.1 mol/kg | | | | | 82 | 89 |
| Example 4-3 | | Chemical formula 10(2) 0.1 mol/kg | | | | | 82 | 90 |
| Comparative example 3-3 | LiPF$_6$ 1.0 mol/kg | | EC + DEC | Trans-DFEC 5 wt % | — | — | 78 | 82 |

As shown in Table 4, in Examples 4-1 to 4-3, the discharge capacity retention ratios of the ambient temperature cycle for the secondary batteries of Comparative examples 5-1 and 5-2, the results shown in Table 5 were obtained. In Table 5, the characteristics of Examples 1-2 and 3-2 and Comparative examples 1-1 and 3-1 are shown together.

TABLE 5

| | Anode active material | Electrolyte salt | Solvent | Sulfone compound Kind | wt % | Discharge capacity retention ratio (%) Ambient temperature cycle characteristics | High temperature storage characteristics |
|---|---|---|---|---|---|---|---|
| Example 1-2 | Si (electron beam deposition method) | LiPF$_6$ 1.0 mol/kg | EC + DEC | Chemical formula 2(1) | 1 | 62 | 85 |
| Example 3-2 | Si (sintering method) | | | | | 56 | 84 |
| Comparative example 1-1 | Si (electron beam deposition method) | LiPF$_6$ 1.0 mol/kg | EC + DEC | . | . | 52 | 74 |
| Comparative example 3-1 | Si (sintering method) | | | | | 45 | 75 |
| Comparative example 5-1 | Artificial graphite | | | Chemical formula 2(1) | 1 | 89 | 86 |
| Comparative example 5-2 | | | | — | — | 89 | 84 |

In Comparative examples 5-1 and 5-2 in which the artificial graphite was used as the anode active material, effects similar to those of Examples 1-2 and 3-2 and Comparative examples 1-1 and 3-1 using silicon were obtained. That is, in Comparative example 5-1 in which the electrolytic solution contained the sulfone compound of Chemical formula 2(1), the discharge capacity retention ratio of the high temperature storage characteristics was higher than that of Comparative example 5-2 in which the electrolytic solution did not contain the sulfone compound of Chemical formula 2(1). Meanwhile, the discharge capacity retention ratio of the ambient temperature cycle characteristics of Comparative example 5-1 was equal to that of Comparative example 5-2.

However, when Examples 1-2 and 3-2 using silicon were compared to Comparative example 5-1 using the artificial graphite, the improvement ratio of the cycle characteristics and the storage characteristics of the former were larger than that of the latter. Specifically, the increase ratios of the discharge capacity retention ratios of the ambient temperature cycle characteristics and the high temperature storage characteristics that was attained due to the sulfone compound of Chemical formula 2(1) in the electrolytic solution were respectively 0% and 2.3% in Comparative example 5-1, 19.2% and 14.8% in Example 1-2, 24.4% and 12.0% in Example 3-2, and stayed in the single-digit in Comparative example 5-1, but reached the double digit in Examples 1-2 and 3-2. The result can be understood as follows. When silicon with the high energy density was used as an anode active material, decomposition reaction of the electrolytic solution in the anode 34 was generated more easily than in the case using a carbon material. Therefore, the decomposition inhibition effects of the electrolytic solution by the sulfone compound of Chemical formula 2(1) significantly worked. Thus, in the secondary battery using silicon as an anode active material, the decomposition inhibition effects of the electrolytic solution became larger, compared to the secondary battery using the carbon material, and thus it was confirmed that the improvement ratio of the cycle characteristics and the storage characteristics became large. For a case using tin as an anode active material, no examples have been herein disclosed. However, it is evident that the above-mentioned effects can be also obtained in the case of using tin, since tin has physical properties similar to those of silicon in terms of the above-mentioned energy density and the above-mentioned easiness of decomposition reaction of the electrolytic solution.

The present application has been described with reference to the embodiments. However, the present application is not limited to the aspects described in the foregoing embodiments and the foregoing examples, and various modifications may be made. For example, in the foregoing embodiments and the foregoing examples, descriptions have been given of the lithium ion secondary battery in which the anode capacity is expressed by the capacity component based on insertion and extraction of lithium as the battery of the application. However, the battery of the application is not limited thereto. The battery of the application can be similarly applied to a secondary battery in which the anode capacity includes the capacity component based on insertion and extraction of lithium and the capacity component based on precipitation and dissolution of lithium, and the anode the description has been given of the case using lithium as an electrode reactant. However, as an electrode reactant, other Group 1A element such as sodium (Na) and potassium (K), Group 2A element such as magnesium and calcium (Ca), or other light metal such as aluminum may be used. In this case, the anode material described in the foregoing embodiments can be used as an anode active material as well.

Further, in the foregoing embodiments and the foregoing examples, descriptions have been given with the specific examples of the cylindrical or laminated film type secondary battery as a battery structure of the battery of the application. However, the battery of the application can be similarly applied to a battery having other shape such as a coin type battery, a button type battery, and a square battery, or a battery having other structure such as a lamination structure. Further, the battery of the application can be applied to other batteries such as primary batteries in addition to the secondary batteries.

Further, in the foregoing embodiments and the foregoing examples, regarding the content of the sulfone compound shown in Chemical formula 1 in the electrolytic solution, the appropriate ranges thereof derived from the results of the examples have been described. However, such a description does not totally eliminate the possibility that the content may be out of the foregoing ranges. That is, the foregoing appropriate ranges are ranges particularly preferable for obtaining the effects of the application. Therefore, as long as effects of the application can be obtained, the content may be out of the foregoing ranges in some degrees.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A battery comprising:
   a cathode;
   an anode; and
   an electrolytic solution, wherein:
   the anode contains a silicon anode active material consisting of silicon,
   the electrolytic solution consists of a solvent, an electrolyte salt, and a sulfone compound shown in Chemical formula 1:

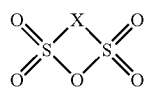

Chemical formula 1 where X represents an alkylene group with the carbon number in a range from 2 to 4 or an alkenylene group with the carbon number in a range from 2 to 4, and
   the solvent includes at least one of 4-fluoro-1,3-dioxolane-2-one and 4,5-difluoro-1,3-dioxolane-2-one.

2. The battery according to claim 1, wherein a content of the sulfone compound in the electrolytic solution is in a range from 0.01 wt % to 5 wt %.

3. The battery according to claim 1, wherein the anode includes an anode current collector and an anode active material layer provided thereon; and
   an interface between the anode current collector and the anode active material layer is alloyed at least in part.

4. The battery according to claim 3, wherein the anode active material layer is formed by at least one method selected from the group consisting of vapor-phase deposition method, liquid-phase deposition method, and firing method.

5. The battery according to claim 1, wherein the solvent contains cyclic ester carbonate having an unsaturated bond.

6. The battery according to claim 1, wherein the electrolyte salt contains at least one selected from the group consisting of lithium hexafluorophosphate, lithium tetrafluoroborate, lithium perchlorate, lithium hexafluoroarsenate, and compounds shown in Chemical formula 4 to Chemical formula 6:

Chemical formula 4 where m and n represent an integer number of 1 or more, and are identical or different;

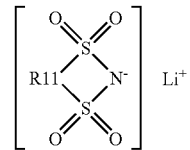

Chemical formula 5 where R11 represents a straight chain/branched perfluoro alkylene group with a carbon number in a range from 2 to 4;

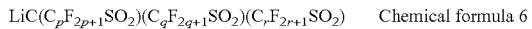

Chemical formula 6 where p, q, and r represent an integer number of 1 or more and are identical or different.

7. The battery according to claim 1, wherein the sulfone compound is a compound represented by Chemical formula 2(1) or Chemical formula 2(2):

Chemical formula 2

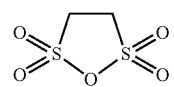
(1)

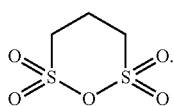
(2)

* * * * *